US012554928B2

(12) United States Patent
Li et al.

(10) Patent No.: US 12,554,928 B2
(45) Date of Patent: Feb. 17, 2026

(54) TEXT RECOGNITION METHOD AND APPARATUS, COMPUTER-READABLE STORAGE MEDIUM AND ELECTRONIC DEVICE

(71) Applicant: PATSNAP LIMITED, Jiangsu (CN)

(72) Inventors: Fake Li, Suzhou (CN); Weilei Wang, Suzhou (CN); Changyang Tu, Suzhou (CN); Jeffrey Jee Hui Tiong, Suzhou (CN)

(73) Assignee: PATSNAP LIMITED, Jiangsu (CN)

( * ) Notice: Subject to any disclaimer, the term of this patent is extended or adjusted under 35 U.S.C. 154(b) by 301 days.

(21) Appl. No.: 18/217,766

(22) Filed: Jul. 3, 2023

(65) Prior Publication Data

US 2023/0351110 A1 Nov. 2, 2023

Related U.S. Application Data

(63) Continuation of application No. PCT/CN2022/107580, filed on Jul. 25, 2022.

(30) Foreign Application Priority Data

Jul. 23, 2021 (CN) ......................... 202110839399.2

(51) Int. Cl.
*G06F 40/289* (2020.01)
*G06F 40/40* (2020.01)
*G06N 20/00* (2019.01)

(52) U.S. Cl.
CPC ............ *G06F 40/289* (2020.01); *G06F 40/40* (2020.01); *G06N 20/00* (2019.01)

(58) Field of Classification Search
None
See application file for complete search history.

(56) References Cited

U.S. PATENT DOCUMENTS 9,454,731 B1 * 9/2016 Lee ........................ G06N 3/049
2018/0293507 A1 10/2018 Lian et al.
2020/0395001 A1 12/2020 Mohanty et al.

FOREIGN PATENT DOCUMENTS

CN 104536953 A * 4/2015
CN 108628974 A * 10/2018 ............. G06F 16/00
(Continued)

OTHER PUBLICATIONS

English translation of CN104536953 (Year: 2015).*
English translation of CN108628974 (Year: 2018).*
English translation of CN110929025 (Year: 2020).*

*Primary Examiner* — Antim G Shah
(74) *Attorney, Agent, or Firm* — Birch, Stewart, Kolasch & Birch, LLP

(57) ABSTRACT

A text recognition method, a text recognition apparatus, a computer-readable storage medium, and an electronic device are provided. In the text recognition method, adjacent character strings in a plurality of character strings partially overlap, so that the plurality of character strings may reflect the relationship between the contexts of a text to be recognized, then word vector conversion is performed on the plurality of character strings to obtain a plurality of word vectors, word vector recognition results respectively corresponding to the plurality of word vectors are generated on the basis of the plurality of word vectors to determine whether a text corresponding to the word vectors is an effect text or a non-effect text, and the plurality of word vector recognition results are synthesized to determine a text recognition result of the text to be recognized.

15 Claims, 11 Drawing Sheets

Determining a plurality of character strings corresponding to a text to be recognized on the basis of the text to be recognized — 210

Performing word vector conversion on the plurality of character strings to obtain a plurality of word vectors — 220

Generating word vector recognition results respectively corresponding to the plurality of word vectors on the basis of the plurality of word vectors — 230

Determining a text recognition result of the text to be recognized on the basis of the word vector recognition results respectively corresponding to the plurality of word vectors — 240

(56) References Cited

FOREIGN PATENT DOCUMENTS

| | | | | | |
|---|---|---|---|---|---|
| CN | 110929025 A | * | 3/2020 | ........... | G06F 40/289 |
| CN | 112632286 A | | 4/2021 | | |
| CN | 112784603 A | | 5/2021 | | |
| CN | 113723096 A | | 11/2021 | | |

* cited by examiner

The present utility model relates to the technical field of agricultural machinery, more particularly to a structure in which a protective cover of a threshing part of a crawler-type harvester is integrally configured. It includes a threshing frame and also includes an integral protective cover

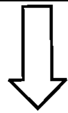

Span1: The present utility model relates to the technical
Span2: relates to the technical field of agricultural machinery
Span3: field of agricultural machinery, more particularly to
Span4: , more particularly to a structure in which
Span5: a structure in which a protective cover of
Span6: a protective cover of a threshing part of
Span7: a threshing part of a crawler-type harvester is
Span8: a crawler-type harvester is integrally configured. It
Span9: integrally configured. It includes a threshing frame
Span10: includes a threshing frame and also includes an
Span11: and also includes an integral protective cover Padding

FIG. 4a

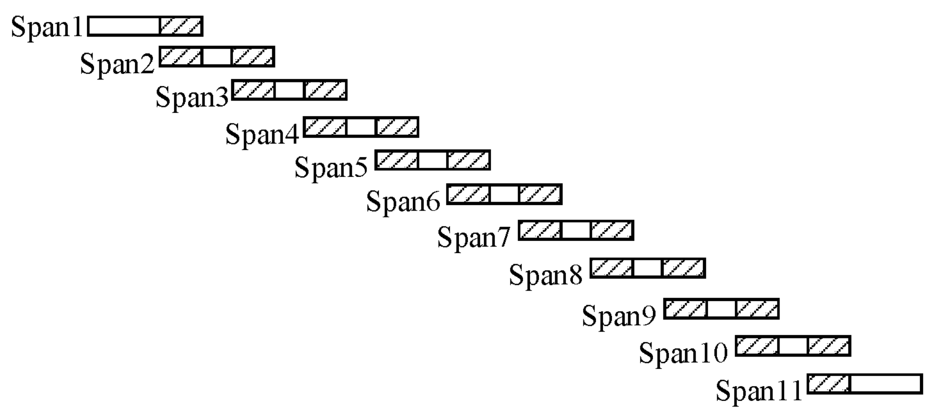

FIG. 4b

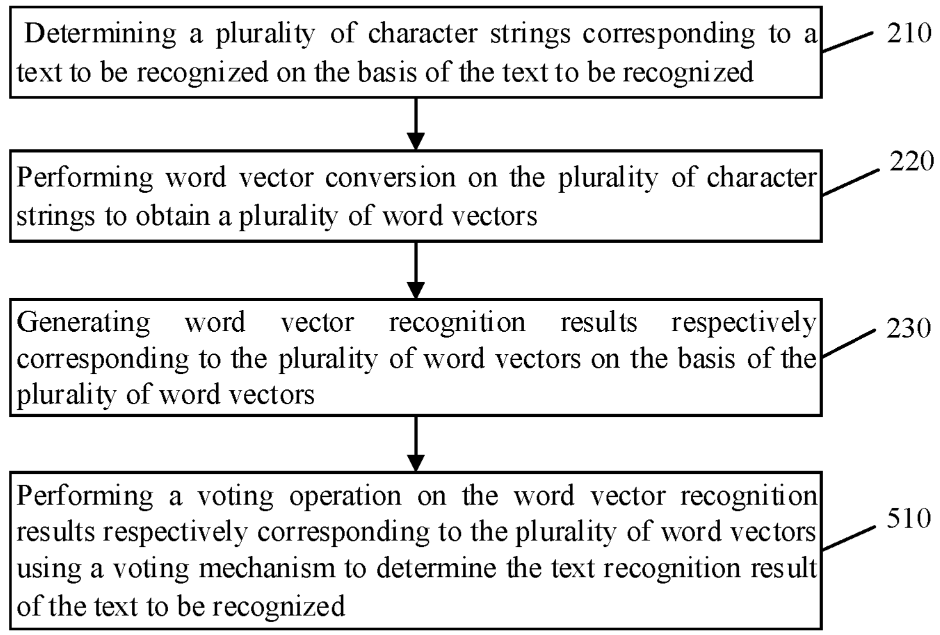
FIG. 5
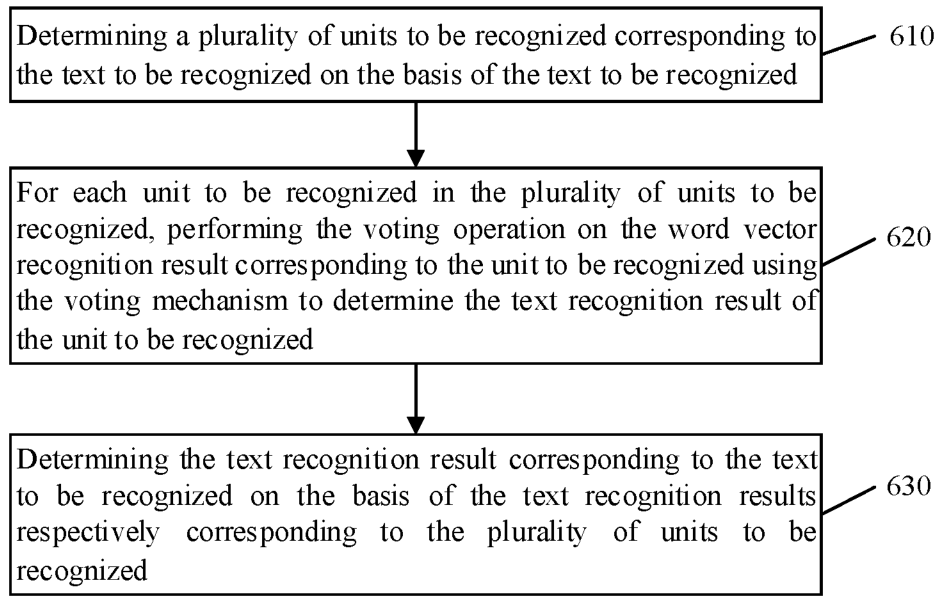
FIG. 6a
Span
T
FIG. 6b

The first effect marking text in Japanese is as follows:

【発明の効果】

【0023】

本発明の一態様によれば、運転者が情報を得やすい表示装置または運転支援システムを提供できる。または、運転者の負担になりにくい表示装置または運転支援システムを提供できる。または、省スペースに適した表示装置または運転支援システムを提供できる。または、車内の景観を阻害しない表示装置または運転支援システムを提供できる。または、新規な表示装置または運転支援システムを提供できる。

【0024】

なお、これらの効果の記載は、他の効果の存在を妨げるものではない。なお、本発明の一態様は、必ずしも、これらの効果の全てを有する必要はない。なお、これら以外の効果は、明細書、図面、請求項などの記載から抽出することが可能である。

The translated Chinese text of the above Japanese text is as follows:

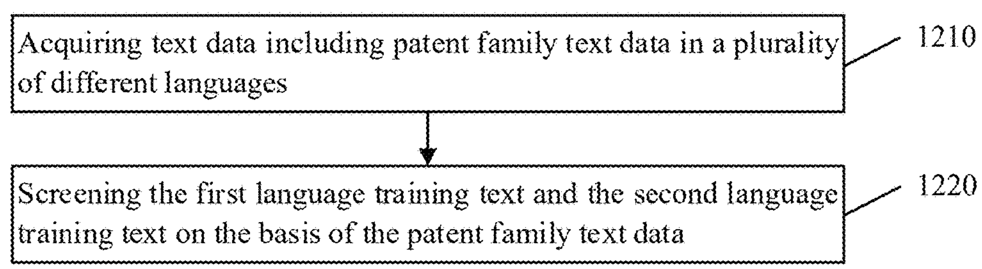

FIG.12

TEXT RECOGNITION METHOD AND APPARATUS, COMPUTER-READABLE STORAGE MEDIUM AND ELECTRONIC DEVICE

CROSS-REFERENCE TO RELATED APPLICATIONS

The present application is a Continuation Application of International Application No. PCT/CN2022/107580, filed on Jul. 25, 2022, which claims priority to Chinese Patent Application No. 202113839399.2 filed on Jul. 23, 2021, with the Patent Office of China National Intellectual Property Administration, each of which is incorporated herein by reference in its entirety.

TECHNICAL FIELD

The present disclosure relates to the technical field of text processing, more particularly, to a text recognition method and apparatus, a computer-readable storage medium, and an electronic device.

BACKGROUND

A patent document mainly includes three parts, namely, the technical problem, the technical solution, and the technical effects. A patent document can be classified finely according to the technical effects part of the patent document.

Currently, a method is available for classifying a patent document by which bibliographic information of the patent is taken to recognize an effect text. However, the bibliographic information of the patent is too broad to accurately recognize the effect text, and thus the patent document cannot be finely classified. In the related art, to improve the accuracy of recognizing an effect text, the effect text is mainly determined through rule indexing or manual indexing. The rule indexing is to determine the effect text by recognizing specific grammar patterns, which is easy to omit other expressions that cannot be covered by the grammar patterns, leading to the omission of important patent information and low accuracy of text recognition. Although the manual indexing has high accuracy, it requires a lot of manpower, resulting in low efficiency of text recognition.

SUMMARY

In view of the above, a text recognition method and apparatus, a computer-readable storage medium, and an electronic device are provided in the embodiments of the present disclosure to solve the problem of inaccurate and inefficient text recognition.

In a first aspect, a text recognition method is provided in an embodiment of the present disclosure, including: determining, on the basis of a text to be recognized, a plurality of character strings corresponding to the text to be recognized, wherein adjacent character strings in the plurality of character strings partially overlap; performing word vector conversion on the plurality of character strings to obtain a plurality of word vectors, wherein the plurality of word vectors correspond to the plurality of character strings on a one-to-one basis; generating word vector recognition results respectively corresponding to the plurality of word vectors on the basis of the plurality of word vectors, wherein the word vector recognition result is an effect text or a non-effect text; and determining a text recognition result of the text to be recognized on the basis of the word vector recognition results respectively corresponding to each of the plurality of word vectors.

In conjunction with the first aspect of the present disclosure, in some embodiments, the number of the plurality of character strings is M, wherein M is a positive integer greater than 1, and determining, on the basis of the text to be recognized, the plurality of character strings corresponding to the text to be recognized includes: determining a 1st character string of a preset string length on the basis of the text to be recognized; and taking a character in an N-th character string as a starting character of an (N+1)-th character string, decomposing the text to be recognized on the basis of the preset string length and a preset decomposition stride to obtain the (N+1)-th character string, wherein N is a positive integer greater than or equal to 1 and less than M.

In conjunction with the first aspect of the present disclosure, in some embodiments, determining the text recognition result of the text to be recognized on the basis of the word vector recognition results respectively corresponding to the plurality of word vectors includes: performing a voting operation on the word vector recognition results respectively corresponding to the plurality of word vectors using a voting mechanism to determine the text recognition result of the text to be recognized.

In conjunction with the first aspect of the present disclosure, in some embodiments, performing the voting operation on the word vector recognition results respectively corresponding to the plurality of word vectors using the voting mechanism to determine the text recognition result of the text to be recognized includes: determining a plurality of units to be recognized corresponding to the text to be recognized on the basis of the text to be recognized, wherein the unit to be recognized corresponds to at least one of the word vectors; for each unit to be recognized in the plurality of units to be recognized, performing the voting operation on word vector recognition results corresponding to the unit to be recognized using the voting mechanism to determine a text recognition result of the unit to be recognized; and determining the text recognition result corresponding to the text to be recognized on the basis of the text recognition results respectively corresponding to the plurality of units to be recognized.

In conjunction with the first aspect of the present disclosure, in some embodiments, the text to be recognized is a patent text, and the unit to be recognized includes at least one of a sentence, a paragraph, and a text module in the patent text, wherein the text module includes at least one of an abstract module, a claims module, and a description module.

In conjunction with the first aspect of the present disclosure, in some embodiments, for each unit to be recognized in the plurality of units to be recognized, performing the voting operation on the word vector recognition results corresponding to the unit to be recognized using the voting mechanism to determine the text recognition result of the unit to be recognized includes: for each unit to be recognized in the plurality of units to be recognized, if the number of the effect texts is greater than or equal to the number of the non-effect texts in the word vector recognition results corresponding to the unit to be recognized, determining that the text recognition result of the unit to be recognized is an effect text.

In conjunction with the first aspect of the present disclosure, in some embodiments, generating word vector recognition results respectively corresponding to the plurality of word vectors on the basis of the plurality of word vectors includes: generating word vector recognition results respectively corresponding to the plurality of word vectors on the basis of the plurality of word vectors using an effect recognition model, wherein the effect recognition model is used for generating, on the basis of an input word vector, a word vector recognition result corresponding to the input word vector.

In conjunction with the first aspect of the present disclosure, in some embodiments, before generating word vector recognition results respectively corresponding to the plurality of word vectors on the basis of the plurality of word vectors using an effect recognition model, the method further includes: determining a training text and a text recognition result corresponding to the training text; on the basis of the training text and the text recognition result corresponding to the training text, determining a plurality of word vector samples corresponding to the training text and the word vector recognition results respectively corresponding to the plurality of word vector samples; and establishing an initial network model, and training the initial network model on the basis of the plurality of word vector samples and the word vector recognition results respectively corresponding to the plurality of word vector samples to generate an effect recognition model.

In conjunction with the first aspect of the present disclosure, in some embodiments, the training text includes a first language training text and a second language training text, the first language training text includes text contents written in the first language, the second language training text includes text contents written in the second language, the text recognition result corresponding to the first language training text is a first text recognition result, and the text recognition result corresponding to the second language training text is a second text recognition result; determining the training text and the text recognition result corresponding to the training text includes: acquiring the first language training text and the second language training text; obtaining a first effect marking text corresponding to the first language training text on the basis of the first language training text and a first text recognition result; determining a second text recognition result corresponding to the second language training text on the basis of the first effect marking text.

In conjunction with the first aspect of the present disclosure, in some embodiments, determining the second text recognition result corresponding to the second language training text on the basis of the first effect marking text includes: translating the first effect marking text to obtain a translation text corresponding to the first effect marking text, wherein the translation text is expressed in the second language; and determining the second text recognition result on the basis of the translation text corresponding to the first effect marking text using a similarity algorithm.

In conjunction with the first aspect of the present disclosure, in some embodiments, the training text is a patent text, and acquiring the first language training text and the second language training text includes: acquiring text data including patent family text data in a plurality of different languages; screening the first language training text and the second language training text on the basis of the patent family text data, wherein the first language training text includes effect identification paragraph information, and the second language training text includes patent text to be marked with effect.

In conjunction with the first aspect of the present disclosure, in some embodiments, the first language includes Japanese, and the first language training text includes a Japanese patent text.

In a second aspect, a text recognition apparatus is provided in an embodiment of the present disclosure, including: a splitting module configured to determine, on the basis of a text to be recognized, a plurality of character strings corresponding to the text to be recognized, wherein adjacent character strings in the plurality of character strings partially overlap; a converting module configured to perform word vector conversion on the plurality of character strings to obtain a plurality of word vectors, wherein the plurality of word vectors correspond to the plurality of character strings on a one-to-one basis; a generating module configured to generate word vector recognition results respectively corresponding to the plurality of word vectors on the basis of the plurality of word vectors, wherein the word vector recognition result is an effect text or a non-effect text; and a determining module configured to determine a text recognition result of the text to be recognized on the basis of the word vector recognition results respectively corresponding to the plurality of word vectors.

In a third aspect, a computer-readable storage medium is provided in an embodiment of the present disclosure, and the computer-readable storage medium is stored with instructions that, when executed by a processor of an electronic device, enable the electronic device to perform the text recognition method in any one of the embodiments described above.

In a fourth aspect, an electronic device is provided in an embodiment of the present disclosure, and the electronic device includes a processor and a memory for storing computer-executable instructions; the processor is configured to execute the computer-executable instructions to implement the text recognition method in any one of the embodiments described above.

According to the text recognition method disclosed in the embodiments of the present disclosure, by determining a plurality of character strings corresponding to a text to be recognized on the basis of the text to be recognized, wherein adjacent character strings in the plurality of character strings partially overlap, the plurality of character strings can reflect the relationship between the contexts of the text to be recognized. Then, word vector conversion is performed on the plurality of character strings to obtain a plurality of word vectors, and word vector recognition results respectively corresponding to the plurality of word vectors are generated on the basis of the plurality of word vectors, so as to determine whether the text corresponding to the word vectors is an effect text or a non-effect text, and a text recognition result of the text to be recognized is determined according to the word vector recognition results respectively corresponding to the plurality of word vectors, so that the text recognition can be performed more finely. Also, the text recognition result of the text to be recognized can be determined by synthesizing the plurality of word vector recognition results, the relationship between the contexts of the text to be recognized is recognized, thus improving the accuracy of text recognition. In addition, in the text recognition method of the present disclosure, manual indexing is not required, and the efficiency of text recognition is improved.

BRIEF DESCRIPTION OF DRAWINGS

FIG. 4*a* is a schematic diagram of a character string determining method according to an embodiment of the present disclosure.

FIG. 4*b* is a schematic diagram of a character string determining method according to another embodiment of the present disclosure.

FIG. 5 is a schematic flowchart of a text recognition method according to another embodiment of the present disclosure.

FIG. 6*a* is a schematic flowchart of a text recognition method according to another embodiment of the present disclosure.

FIG. 6*b* is a schematic diagram of a correspondence relationship between a unit to be recognized and a character string according to an embodiment of the present disclosure.

FIG. 11*b* is a schematic diagram of a first effect marking text according to an embodiment of the present disclosure.

FIG. 12 is a schematic flowchart of a text recognition method according to another embodiment of the present disclosure.

DETAILED DESCRIPTION

The technical solutions in the embodiments of the present disclosure will be clearly and completely described with reference to the drawings in the embodiments of the present disclosure. Obviously, the described embodiments are only some of the embodiments of the present disclosure, not all of them. On the basis of the embodiments in the present disclosure, all the other embodiments obtained by a person of ordinary skill in the art without involving any inventive effort fall within the protection scope of the present disclosure.

The technical solutions provided in the present disclosure can be applied to an intelligent terminal, such as a tablet computer and a mobile phone, so as to enable the intelligent terminal to have relevant functions, such as a function of recognizing an effect text, and a function of translating a text, etc.

Illustratively, the technical solutions provided in the present disclosure can be applied to patent search scenarios. Specifically, in a patent search scenario, particularly in the scenario of searching for the technical effects of a patent, it can identify the subject matter of a patent document through the technical effects and accordingly classify the patent by the technical solutions provided in the present disclosure, thereby improving the efficiency of patent search. Alternatively, in the present disclosure, it can narrow the scope of finding any words related to the technical effects by using an in-depth learning network model to recognize paragraphs related to the technical effects. Alternatively, in the present disclosure, contents concerning the technical effects of a patent can be presented directly, which can save time for a user to read the patent document and help the user to quickly understand the subject matter and technical features of the patent.

In addition to the above-mentioned patent search scenarios, the present disclosure can also be applied to many other scenarios in the form of a server. A brief description is provided below with reference to FIG. 1.

Figure 1:
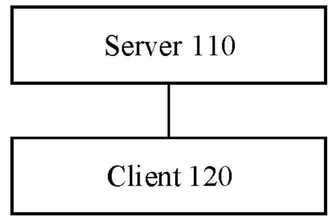
FIG. 1 is a schematic diagram of an application scenario of a text recognition method according to an embodiment of the present disclosure.

FIG. 1 is a schematic diagram of an application scenario of a text recognition method according to an embodiment of the present disclosure. The scenario shown in FIG. 1 includes a server 110 and a client 120 communicatively connected to the server 110. Specifically, the server 110 is configured for: determining a plurality of word vectors on the basis of a text to be recognized, where the plurality of word vectors are used for representing semantic grammar information about the text to be recognized; generating word vector recognition results respectively corresponding to the plurality of word vectors on the basis of the plurality of word vectors, where the word vector recognition result is an effect text or a non-effect text; and determining a text recognition result of the text to be recognized on the basis of the word vector recognition results respectively corresponding to the plurality of word vectors.

Illustratively, in an actual application, the client 120 may receive a text to be recognized input by a user and transmit the same to the server 110, the server 110 generates a text recognition result on the basis of the text to be recognized and transmits the text recognition result to the client 120, and the client 120 presents the text recognition result to the user.

Exemplary Method

Text recognition methods provided in the present disclosure will be briefly described below with reference to FIGS. 2 to 13.

Figure 2:
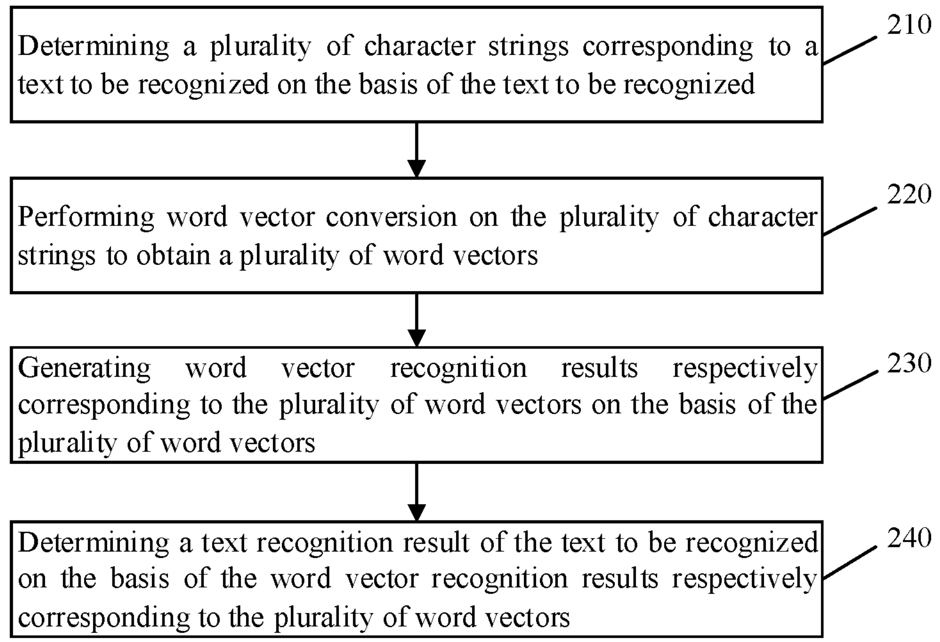
FIG. 2 is a schematic flowchart of a text recognition method according to an embodiment of the present disclosure.

FIG. 2 is a schematic flowchart of a text recognition method according to an embodiment of the present disclosure. As shown in FIG. 2, the text recognition method provided by the embodiment of the present disclosure includes the following steps.

Step 210, determining a plurality of character strings corresponding to a text to be recognized on the basis of the text to be recognized.

Illustratively, adjacent character strings in the plurality of character strings partially overlap. As an example, the text to be recognized is "The present utility model relates to the technical field of agricultural machinery, more particularly to a structure in which a protective cover of a threshing part of a crawler-type harvester is integrally configured. It includes a threshing frame, and also includes an integral protective cover". The plurality of character strings corresponding to the text to be recognized may be "Span1: The present utility model relates to the technical field of agricultural machinery", "Span2: technical field of agricultural machinery, more particularly to a structure in which a protective cover of a threshing part of a crawler-type harvester", "Span3: a threshing part of a crawler-type harvester is integrally configured. It includes a threshing frame", "Span4: It includes a threshing frame, and also includes an integral protective cover". "Span" means a character string, "Span1" means a 1st character string, "Span2" means a 2nd character string, and so on. These character strings may include the same number of characters or may each include a different number of characters, which is not particularly limited herein. Adjacent character strings may include some same characters, as an example, the 1st character string and the 2nd character string both include "technical field of agricultural machinery".

The text to be recognized may be a sentence, a paragraph, or a full text, which is not specifically limited herein.

Step 220, performing word vector conversion on the plurality of character strings to obtain a plurality of word vectors.

Illustratively, the plurality of word vectors are in one-to-one correspondence with the plurality of character strings. Word vector conversion on the plurality of character strings can be performed using Word2vec (word to vector), where Word2vec is a model for generating word vectors. A character string is input into Word2vec and then a corresponding word vector is obtained.

Step 230, generating word vector recognition results respectively corresponding to the plurality of word vectors on the basis of the plurality of word vectors.

Illustratively, the word vector recognition result is an effect text or a non-effect text. Each word vector corresponds to a word vector recognition result. The effect text is a text representing technical effects, and the non-effect text is a text other than the text representing technical effects.

In an embodiment of the present disclosure, the text to be recognized may be a patent text, the effect text is a text representing technical effects in the patent text, and the non-effect text is a text other than the text representing technical effects in the patent text.

Step 240, determining a text recognition result of the text to be recognized on the basis of the word vector recognition results respectively corresponding to the plurality of word vectors.

Specifically, if the text to be recognized is a sentence, the text recognition result of the text to be recognized may be that the sentence is an effect text or a non-effect text. If the text to be recognized is a paragraph, the text recognition result of the text to be recognized may be that the paragraph is an effect text or a non-effect text. If the text to be recognized is a full text, the text recognition result of the text to be recognized may be that a sentence or a paragraph in the full text is marked as an effect text.

By determining a plurality of character strings corresponding to the text to be recognized, and performing word vector conversion on the plurality of character strings to obtain a plurality of word vectors, the text to be recognized can be comprehensively represented by the plurality of word vectors, which provides accurate data support for text recognition.

According to the text recognition method provided in the embodiment of the present disclosure, by determining a plurality of character strings corresponding to the text to be recognized on the basis of the text to be recognized, where adjacent character strings in the plurality of character strings partially overlap, the plurality of character strings can reflect the relationship between the contexts of the text to be recognized. Then, word vector conversion is performed on the plurality of character strings to obtain a plurality of word vectors, word vector recognition results respectively corresponding to the plurality of word vectors are generated on the basis of the plurality of word vectors, so as to determine whether the text corresponding to the word vectors is an effect text or a non-effect text, and a text recognition result of the text to be recognized is determined according to the word vector recognition results respectively corresponding to the plurality of word vectors, which can perform the text recognition more finely. Also, the text recognition result of the text to be recognized can be determined by synthesizing the plurality of word vector recognition results, and the relationship between the contexts of the text to be recognized is recognized, thus improving the accuracy of text recognition. In addition, according to the text recognition method of the present disclosure, manual indexing is not required, and the efficiency of text recognition is improved.

Figure 3:
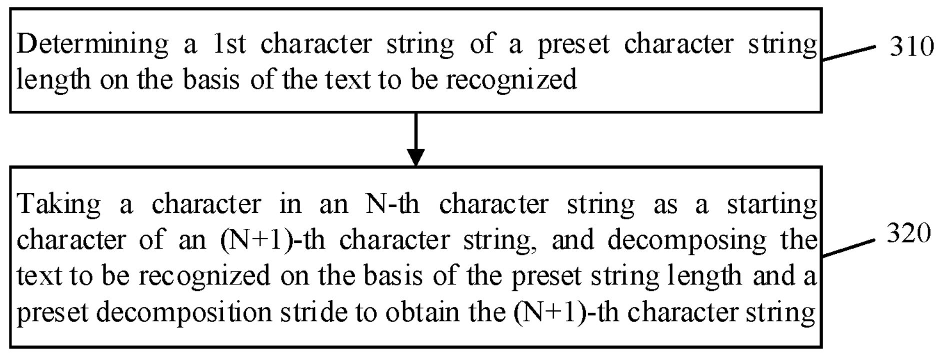
FIG. 3 is a schematic flowchart of a text recognition method according to another embodiment of the present disclosure.

FIG. 3 is a schematic flowchart of a text recognition method according to another embodiment of the present disclosure. The embodiment shown in FIG. 3 of the present disclosure is derived based on the embodiment shown in FIG. 2 of the present disclosure, the following description will focus on the differences between the embodiments shown in FIG. 3 and FIG. 2, and the similarities between the embodiments will not be repeated. As shown in FIG. 3, the step of determining a plurality of character strings corresponding to the text to be recognized on the basis of the text to be recognized includes the following steps.

Step 310, determining a 1st character string of a preset character string length on the basis of the text to be recognized.

Illustratively, the number of the plurality of character strings is M, where M is a positive integer greater than or equal to 1. The preset character string length may be a preset length of a character string, for example, 256 characters or 128 characters, and the preset character string length may be selected according to practical needs, which is not specifically limited herein.

Step 320, taking a character in an N-th character string as a starting character of an (N+1)-th character string, and decomposing the text to be recognized on the basis of the preset string length and a preset decomposition stride to obtain the (N+1)-th character string.

Illustratively, N is a positive integer greater than or equal to 1 and less than M. The preset decomposition stride can be 128 characters or 64 characters, and the preset decomposition stride can be selected according to practical needs, which is not specifically limited herein.

Illustratively, the plurality of character strings may be determined by using a sliding window method. As shown in FIG. 4*a*, the text to be recognized is "The present utility model relates to the technical field of agricultural machinery, more particularly to a structure in which a protective cover of a threshing part of a crawler-type harvester is integrally configured. It includes a threshing frame and also includes an integral protective cover". The preset character string length of the sliding window may be 20 characters, and the preset decomposition stride of the sliding window may be 8 characters, wherein a character may refer to a Chinese character, an English word, or a punctuation mark, etc. The plurality of character strings corresponding to the text to be recognized are "Span 1: The present utility model relates to the technical", "Span 2: relates to the technical field of agricultural machinery", "Span 3: field of agricultural machinery, more particularly to", "Span 4: , more particularly to a structure in which", "Span 5: a structure in which a protective cover of", "Span 6: a protective cover of a threshing part of", "Span 7: a threshing part of a crawler-type harvester is", "Span 8: a crawler-type harvester is integrally configured. It", "Span 9: integrally configured. It includes a threshing frame", "Span 10: includes a threshing frame and also includes an", and "Span 11: and also includes an integral protective cover Padding".

That is, in FIG. 4*a*, the number M of character strings is 11. If N is 1, the 1st character string is Span 1, and the (N+1)-th character string is Span 2, that is, a character in Span 1 is the starting character of Span 2. "Padding" is an automatic placeholder, if the length of the last character string is smaller than the preset character string length, it can use "Padding" to supplement the length of the character string, so that the length of the last character string is equal to the preset character string length. As shown in FIG. 4*b*, a rectangle in FIG. 4*b* represents a character string, and a rectangle marked with section lines represents a portion where adjacent character strings overlap.

By determining the 1st character string of a preset character string length, taking a character in the N-th character string as the starting character of the (N+1)-th character string, and decomposing the text to be recognized on the basis of the preset character string length and the preset decomposition stride to obtain the (N+1)-th character string, so that each of the character strings includes the same number of characters, and adjacent character strings include the same number of overlapping characters, thereby improving the uniformity of decomposing the character strings and better representing the semantic grammar relationship between the character strings, so as to provide more accurate data support for text recognition.

FIG. 5 is a schematic flowchart of a text recognition method according to another embodiment of the present disclosure. The embodiment shown in FIG. 5 of the present disclosure is derived based on the embodiment shown in FIG. 2 of the present disclosure, the description below will focus on the differences between the embodiments shown in FIG. 5 and FIG. 2, and the similarities between the embodiments will not be repeated. As shown in FIG. 5, the step of determining the text recognition result of the text to be recognized on the basis of the word vector recognition results respectively corresponding to the plurality of word vectors includes the following step.

Step 510, performing a voting operation on the word vector recognition results respectively corresponding to the plurality of word vectors using a voting mechanism to determine the text recognition result of the text to be recognized.

Illustratively, for the text to be recognized, if the number of effect texts is greater than or equal to the number of non-effect texts in the word vector recognition results corresponding to the text to be recognized, the text recognition result of the text to be recognized is determined as the effect text. If the number of effect texts is less than the number of non-effect texts in the word vector recognition results corresponding to the text to be recognized, the text recognition result of a unit to be recognized is determined as the non-effect text.

Since adjacent character strings in the plurality of character strings partially overlap, by performing the voting operation on the word vector recognition results respectively corresponding to the plurality of word vectors using the voting mechanism to determine the text recognition result of the text to be recognized, it can recognize the relationship between the contexts of the text to be recognized, thereby improving the accuracy of the text recognition. Meanwhile, the voting mechanism follows the voting rule that the minority obeys the majority, thereby further improving the accuracy of the text recognition.

FIG. 6*a* shows a schematic flowchart of a text recognition method according to another embodiment of the present disclosure. The embodiment shown in FIG. 6*a* of the present disclosure is derived based on the embodiment shown in FIG. 5 of the present disclosure, the description below will focus on the differences between the embodiments shown in FIG. 6*a* and FIG. 5, and the similarities between the embodiments will not be repeated. As shown in FIG. 6*a*, the step of performing the voting operation on the word vector recognition results respectively corresponding to the plurality of word vectors using the voting mechanism to determine the text recognition results of the text to be recognized includes the following steps.

Step 610, determining a plurality of units to be recognized corresponding to the text to be recognized on the basis of the text to be recognized.

Illustratively, the unit to be recognized corresponds to at least one word vector. If the text to be recognized is a full text, the unit to be recognized may be a sentence or a paragraph in the full text. Character strings may be text segments obtained by decomposing the sentence or paragraph. The word vectors correspond to the character strings on a one-to-one basis.

In an embodiment of the present disclosure, the text to be recognized is a patent text, and the unit to be recognized may be at least one of a sentence, a paragraph, and a text module in the patent text. The text module may be at least one of an abstract module, a claims module, and a description module.

Step 620, for each unit to be recognized in the plurality of units to be recognized, performing the voting operation on the word vector recognition result corresponding to the unit to be recognized using the voting mechanism to determine the text recognition result of the unit to be recognized.

Illustratively, the text recognition result of the unit to be recognized may be an effect text or a non-effect text.

Figure 6C:
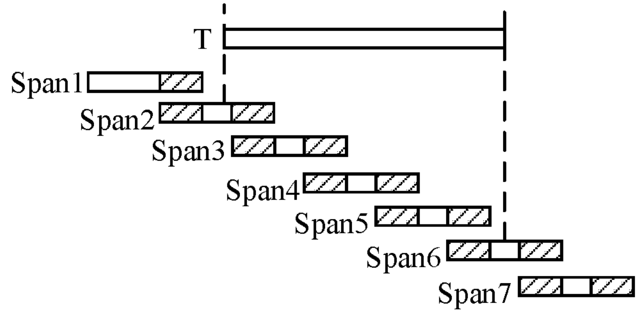
FIG. 6*c* is a schematic diagram of a correspondence relationship between a unit to be recognized and a character string according to another embodiment of the present disclosure.

Specifically, as shown in FIGS. 6*b* and 6*c*, T is a unit to be recognized. The correspondence between the unit to be recognized and the character string may include the following four cases. First, as shown in FIG. 6*b*, a character string contains a unit to be recognized. Second, there is no correspondence between a character string and a unit to be recognized, and as shown in FIG. 6*c*, the relationship between T and Span 1 or Span 7 belongs to the second case. Third, there is a portion where a character string and a unit to be recognized overlap, or a unit to be recognized contains at least one character string, and as shown in FIG. 6*c*, the relationship between T and Span 2 to Span 6 belongs to the third case. In the first case, the text recognition result of the unit to be recognized depends on the word vector recognition result corresponding to the character string, that is, if the word vector recognition result corresponding to the character string is an effect text, the text recognition result of the unit to be recognized is the effect text; if the word vector recognition result corresponding to the character string is a non-effect text, the text recognition result of the unit to be recognized is the non-effect text. In the second case, there is no correlation between the text recognition result of the unit to be recognized and the word vector recognition result corresponding to the character string. In the third case, the text recognition result of the unit to be recognized depends on the portion where the word vector recognition result overlaps with the unit to be recognized and the word vector recognition result corresponding to the character string contained in the unit to be recognized. That is, the text recognition result of the unit to be recognized T depends on the word vector recognition results of Span 2 to Span 6. In the third case, it is necessary to perform the voting operation on the word vector recognition result corresponding to the unit to be recognized using the voting mechanism to determine the text recognition result of the unit to be recognized.

Step 630, determining the text recognition result corresponding to the text to be recognized on the basis of the text recognition results respectively corresponding to the plurality of units to be recognized.

Illustratively, the text recognition result corresponding to the text to be recognized may be that some sentences or paragraphs are marked as effect texts.

By determining the text recognition result of the unit to be recognized, and determining the text recognition result corresponding to the text to be recognized on the basis of the text recognition results respectively corresponding to the plurality of units to be recognized, it can recognize whether a plurality of parts in the full text are effect texts, so as to mark the parts that are the effect texts, which is convenient for a user to view.

Figure 7:
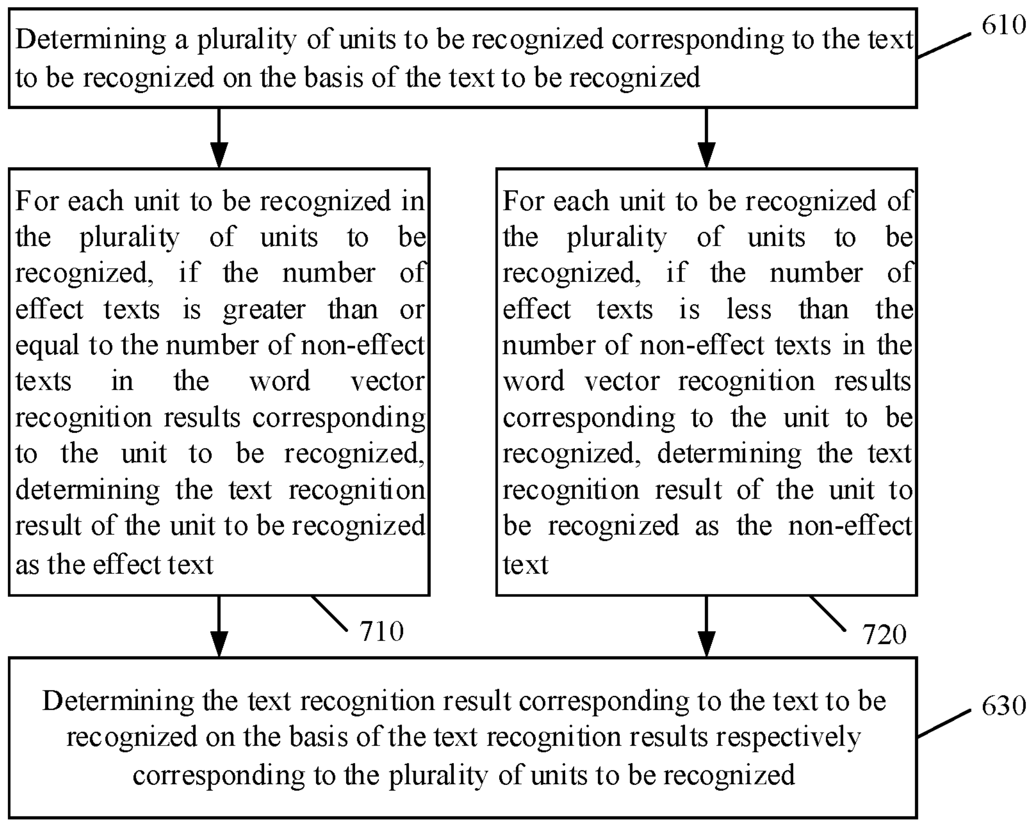
FIG. 7 is a schematic flowchart of g a text recognition method according to another embodiment of the present disclosure.

FIG. 7 is a schematic flowchart of a text recognition method according to another embodiment of the present disclosure. The embodiment shown in FIG. 7 of the present disclosure is derived based on the embodiment shown in FIG. 6 of the present disclosure, the description below will focus on the differences between the embodiments shown in FIG. 7 and FIG. 6, and the similarities between the embodiments will not be repeated. As shown in FIG. 7, for each unit to be recognized of the plurality of units to be recognized, the step of performing the voting operation on the word vector recognition result corresponding to the unit to be recognized using the voting mechanism to determine the text recognition result of the unit to be recognized includes the following steps.

Step 710, for each unit to be recognized in the plurality of units to be recognized, if the number of effect texts is greater than or equal to the number of non-effect texts in the word vector recognition results corresponding to the unit to be recognized, determining the text recognition result of the unit to be recognized as the effect text.

Step 720, for each unit to be recognized of the plurality of units to be recognized, if the number of effect texts is less than the number of non-effect texts in the word vector recognition results corresponding to the unit to be recognized, determining the text recognition result of the unit to be recognized as the non-effect text.

Specifically, for the third case shown in FIG. 6*c*, the text recognition result of the unit to be recognized is a comparison result of the number of effect texts and the number of non-effect texts in the word vector recognition results of Span 2 to Span 6. As an example, the word vector recognition result of Span 2 is an effect text, the word vector recognition result of Span 3 I san effect text, the word vector recognition result of Span 4 is an effect text, the word vector recognition result of Span 5 is a non-effect text, and the word vector recognition result of Span 6 is a non-effect text, that is, the number of effect texts is three, and the number of non-effect texts is two, so the number of effect texts is greater than the number of non-effect texts, and thus the text recognition result of the unit to be recognized is the effect text.

For each unit to be recognized in the plurality of units to be recognized, the text recognition result of the unit to be recognized is determined by using the voting rule that the minority obeys the majority, thereby further improving the accuracy of text recognition.

Figure 8:
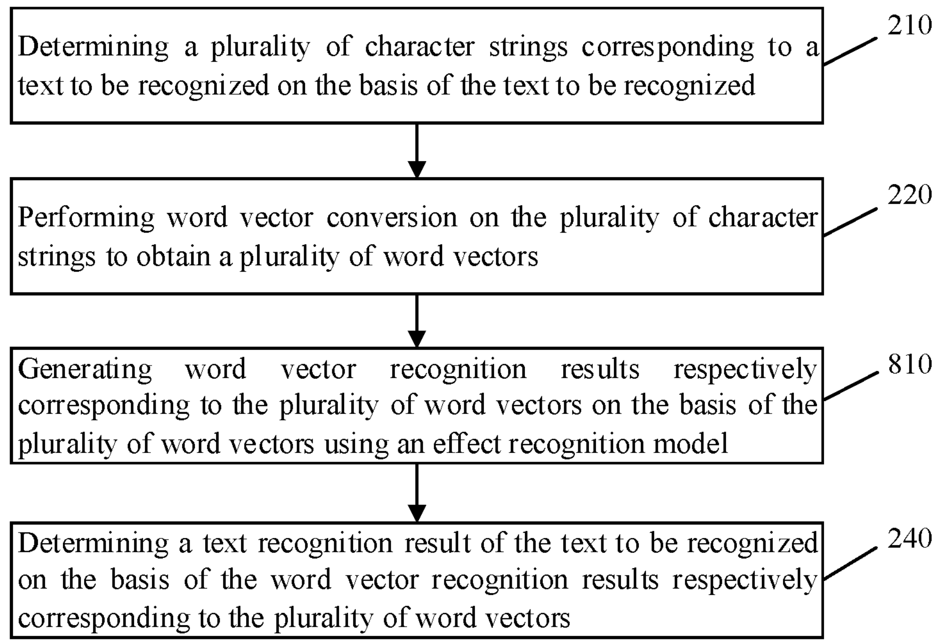
FIG. 8 is a schematic flowchart of a text recognition method according to another embodiment of the present disclosure.

FIG. 8 is a schematic flowchart of a text recognition method according to another embodiment of the present disclosure. The embodiment shown in FIG. 8 of the present disclosure is derived based on the embodiment shown in FIG. 2 of the present disclosure, the description below will focus on the differences between the embodiments shown in FIG. 8 and FIG. 2, and the similarities between the embodiments will not be repeated. As shown in FIG. 8, the step of generating word vector recognition results respectively corresponding to the plurality of word vectors on the basis of the plurality of word vectors includes the following step.

Step 810, generating the word vector recognition results respectively corresponding to the plurality of word vectors on the basis of the plurality of word vectors using an effect recognition model.

Illustratively, the effect recognition model serves to generate a word vector recognition result corresponding to an input word vector on the basis of the input word vector.

By using the effect recognition model to generate word vector recognition results respectively corresponding to the plurality of word vectors, it can obtain the word vector recognition results automatically without manual indexing, thereby reducing human costs.

Figure 9:
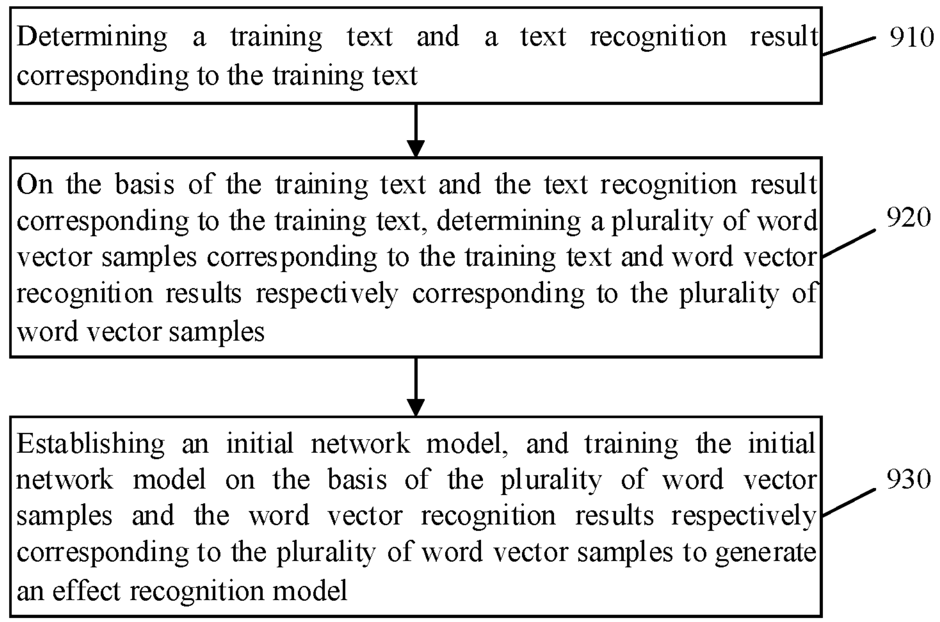
FIG. 9 is a schematic flowchart of a text recognition method according to another embodiment of the present disclosure.

FIG. 9 is a schematic flowchart of a text recognition method according to another embodiment of the present disclosure. The embodiment shown in FIG. 9 of the present disclosure is derived based on the embodiment shown in FIG. 8 of the present disclosure, and the description below will focus on the differences between the embodiments shown in FIG. 9 and FIG. 8, and the similarities between the embodiments will not be repeated. As shown in FIG. 9, before the step of generating word vector recognition results respectively corresponding to the plurality of word vectors on the basis of the plurality of word vectors using an effect recognition model, the method further includes the following steps.

Step 910, determining a training text and a text recognition result corresponding to the training text.

Specifically, the training text mentioned in step 910 corresponds to the text to be recognized in the above-described embodiments.

Step 920, on the basis of the training text and the text recognition result corresponding to the training text, determining a plurality of word vector samples corresponding to the training text and word vector recognition results respectively corresponding to the plurality of word vector samples.

Specifically, the method for determining a plurality of word vector samples corresponding to the training text can refer to the method for determining the plurality of word vectors corresponding to the text to be recognized in the above-described embodiments, which will not be repeated herein. Determining the plurality of word vector recognition results corresponding to the text recognition result may be marking a word vector recognition result of a word vector corresponding to an effect text in the text recognition result as the effect text, and marking a word vector recognition result of a word vector corresponding to the non-effect text in the text recognition result as the non-effect text.

Step 930, establishing an initial network model, and training the initial network model on the basis of the plurality of word vector samples and the word vector recognition results respectively corresponding to the plurality of word vector samples to generate an effect recognition model.

The effect recognition model mentioned in step 930 is used for generating a word vector recognition result corresponding to an input word vector on the basis of the input word vector. The initial network model may be a BERT model. BERT is an open-source pre-trained language model that is trained on the basis of a wide range of data sets. Therefore, the BERT model is a model that has a certain language-based prior knowledge. When the BERT model is used as an initial network model for training, in the training process, the BERT model constantly adjusts the parameters in the model framework, and through continuous iterative adjustment, the BERT model achieves the optimal effect, which improves the learning efficiency of the initial network model and improves the accuracy of the effect recognition model.

Figure 10:
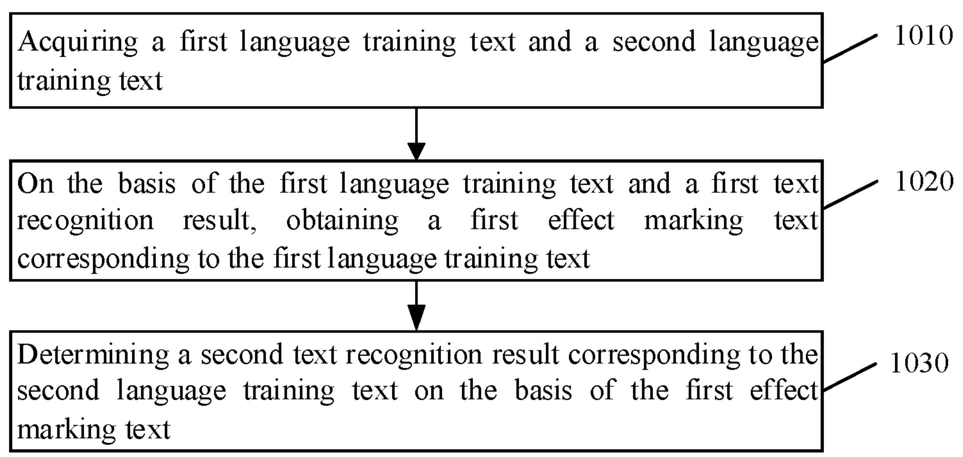
FIG. 10 is a schematic flowchart of a text recognition method according to another embodiment of the present disclosure.

FIG. 10 is a schematic flowchart of a text recognition method according to another embodiment of the present disclosure. The embodiment shown in FIG. 10 of the present disclosure is derived based on the embodiment shown in FIG. 9 of the present disclosure, the description below will focus on the differences between the embodiments shown in FIG. 10 and FIG. 9, and the similarities between the embodiments will not be repeated. As shown in FIG. 10, the step of determining a training text and a text recognition result corresponding to the training text includes the following steps.

Step 1010, acquiring a first language training text and a second language training text.

Step 1020, on the basis of the first language training text and a first text recognition result, obtaining a first effect marking text corresponding to the first language training text.

Illustratively, the first effect marking text may be an effect marking text.

Illustratively, the training text includes the first language training text and the second language training text. The first language training text and the second language training text include equivalent contents written in different languages, where the first language training text includes text contents written in a first language, and the second language training text includes text contents written in a second language. A text recognition result corresponding to the first language training text is a first text recognition result, and a text recognition result corresponding to the second language training text is a second text recognition result. The text recognition result includes the first text recognition result and the second text recognition result.

In an embodiment of the present disclosure, the training text is a patent text, and the first language training text and the second language training text belong to the same patent family. In one embodiment of the present disclosure, the first language includes Japanese and the first language training text includes a Japanese patent text.

Specifically, most of the Japanese patent documents are marked with a mark of "Technical Effects of the Invention", for example, a mark of "発明の効果". In practical applications, Japanese patent texts may be screened first, and then a Japanese patent text marked with the "Technical Effects of the Invention" may be screened. The first effect marking text may be a text of the effect part marked with "Technical Effects of the Invention".

Step 1030, determining a second text recognition result corresponding to the second language training text on the basis of the first effect marking text.

By determining the first language training text and the second language training text, and determining the second text recognition result of the second language training text on the basis of the first effect marking text of the first language training text, it can quickly determine the second text recognition result for the second language training text that does not have the second text recognition result originally, which improves the efficiency of determining the training text and the text recognition result corresponding to the training text.

Figure 11A:
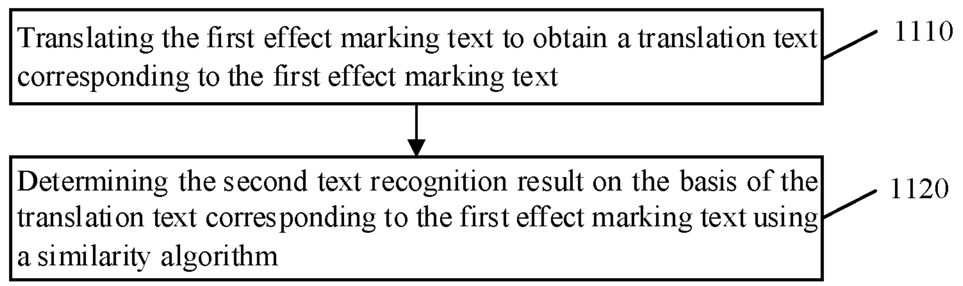
FIG. 11*a* is a schematic flowchart of a text recognition method according to another embodiment of the present disclosure.

FIG. 11*a* is a schematic flowchart of a text recognition method according to another embodiment of the present disclosure. The embodiment shown in FIG. 11*a* of the present disclosure is derived based on the embodiment shown in FIG. 10 of the present disclosure, the description below will focus on the differences between the embodiments shown in FIG. 11*a* and FIG. 10, and the similarities between the embodiments will not be repeated. As shown in FIG. 11*a*, the step of determining a second text recognition result corresponding to the second language training text on the basis of the first effect marking text includes the following steps.

Step 1110, translating the first effect marking text to obtain a translation text corresponding to the first effect marking text.

Illustratively, the translation text is expressed in the second language. The first language may be Japanese. As shown in FIG. 11*b*, the first effect marking text in the first language may be a text of an effect part marked with "発明の効果". The second language may be Chinese, English, or other languages, which is not specifically limited herein.

Step 1120, determining the second text recognition result on the basis of the translation text corresponding to the first effect marking text using a similarity algorithm.

By calculating the similarity between the first effect marking text in the second language and the second language training text, it can obtain a sentence or a paragraph with the highest similarity to the first effect marking text in the second language from the second language training text, that is, the sentence or the paragraph with the highest similarity to the first effect marking text in the second language is the second text recognition result of the second language training text, which quickly determines the second text recognition result and improves the efficiency of determining the training text and the text recognition result corresponding to the training text.

In an embodiment of the present disclosure, the step of translating the first effect marking text to obtain a translation text corresponding to the first effect marking text includes the following steps.

The first effect marking text is input into a text translation model to generate the translation text corresponding to the first effect marking text.

The efficiency of text recognition is further improved by using the text translation model to translate the first effect marking text in the first language into a first effect marking text in the second language.

FIG. 12 is a schematic flowchart of a text recognition method according to another embodiment of the present disclosure. The embodiment shown in FIG. 12 of the present disclosure is derived based on the embodiment shown in FIG. 10 of the present disclosure, the description below will focus on the differences between the embodiments shown in FIG. 12 and FIG. 10, and the similarities between the embodiments will not be repeated. As shown in FIG. 12, the step of acquiring a first language training text and a second language training text includes the following steps.

Step 1210, acquiring text data including patent family text data in a plurality of different languages.

Illustratively, the patent family text data may be simple family text data.

Step 1220, screening the first language training text and the second language training text on the basis of the patent family text data.

Illustratively, the first language training text includes effect identification paragraph information. The second language training text includes a patent text to be marked with effect.

In practical applications, taking a Japanese patent text as the first language training text and a Chinese patent text as the second language training text as an example, the training text can be obtained by following steps:

(1) screening a plurality of groups of family patents from a patent database, where each group of family patents includes Japanese patents and Chinese patents.

(2) screening Japanese patents from all the family patents, and screening Japanese patent texts marked with "technical effect of invention" from all the Japanese patents ;

(3) translating a part marked with "Technical Effects of the Invention" into a Chinese text; and (4) calculating the similarity between the translated Chinese text and the whole Chinese patent, and obtaining a part of the whole Chinese patent with a high similarity to the translated Chinese text as the text recognition result.

Figure 13:
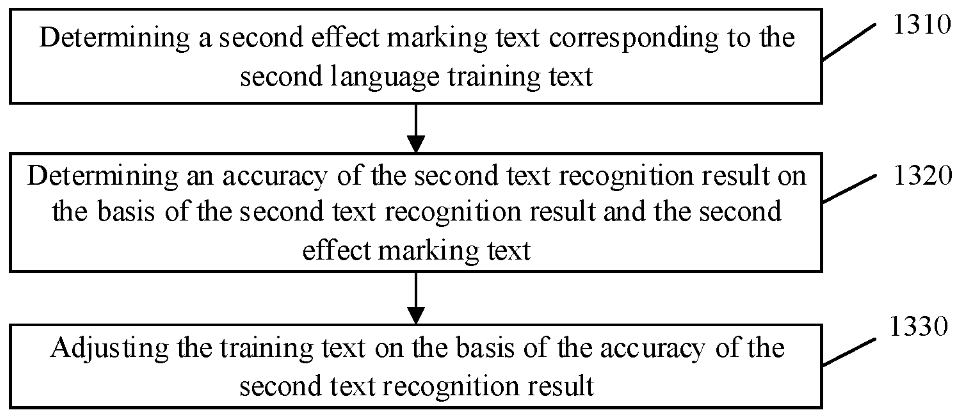
FIG. 13 is a schematic flowchart of a text recognition method according to another embodiment of the present disclosure.

FIG. 13 is a schematic flowchart of a text recognition method according to another embodiment of the present disclosure. The embodiment shown in FIG. 13 of the present disclosure is derived based on the embodiment shown in FIG. 10 of the present disclosure, the description below will focus on the differences between the embodiments shown in FIG. 13 and FIG. 10, and the similarities between the embodiments will not be repeated. As shown in FIG. 13, after the step of determining a second text recognition result corresponding to the second language training text on the basis of the first effect marking text, the method further includes the following steps.

Step 1310, determining a second effect marking text corresponding to the second language training text.

Specifically, the second language training text may also include the second effect marking text. For example, some Chinese patents may also include a text of effect part marked with "Technical Effects of the Invention". The second effect marking text may be the text of effect part marked with "Technical Effects of the Invention", i.e., the effect marking text.

Step 1320, determining an accuracy of the second text recognition result on the basis of the second text recognition result and the second effect marking text.

Specifically, the accuracy can be either a precision A or a recall R.

The precision is calculated as follows:

$$A = \frac{W_1 \cap W_2}{W_1}$$

The recall is calculated as follows:

$$R = \frac{W_1 \cap W_2}{W_2}$$

where W1 is the number of effect paragraphs or effect sentences in the second text recognition results of the second language training texts in all the training texts, and W2 is the number of effect paragraphs or effect sentences in the second effect marking texts of the second language training texts in all the training texts.

Herein, it is drawn from comparative tests that the precision and the recall achieved by the method of the present disclosure are both greater than 90%. In addition, the method of the present disclosure only needs hundreds of thousands of training texts to achieve satisfactory results.

Step 1330, adjusting the training text on the basis of the accuracy of the second text recognition result.

Specifically, when determining the training text, if the accuracy is found to be low, for example, the precision and the recall are both less than 80%, the training text may be adjusted, for example, the training text may be re-selected.

By calculating the accuracy of the second text recognition result to adjust the training text, it improves the quality of the training text, thereby improving the quality of the effect recognition model and further improving the accuracy of text recognition.

Exemplary Apparatus

Embodiments of the method of the present disclosure are described in detail above in conjunction with FIGS. 2 to 13, and embodiments of the apparatus of the present disclosure are described in detail below in conjunction with FIGS. 14 to 24. The description of the embodiments of the method corresponds to the description of the embodiments of the apparatus. Therefore, parts not described in detail can refer to the embodiments of the method described above.

Figure 14:
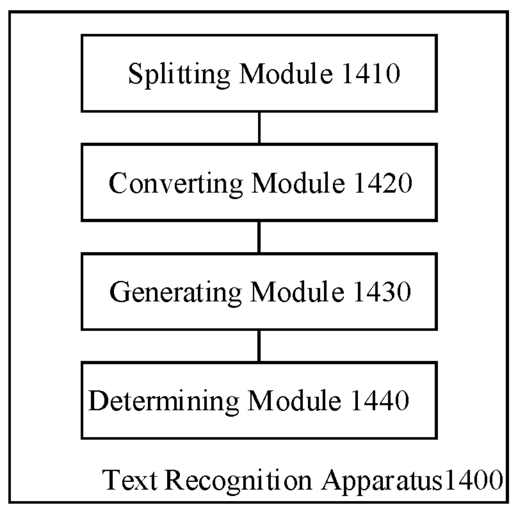
FIG. 14 is a schematic structural diagram of a text recognition apparatus according to an embodiment of the present disclosure.

FIG. 14 is a schematic structural diagram of a text recognition apparatus according to an embodiment of the present disclosure. As shown in FIG. 14, the embodiment of the present disclosure provides a text recognition apparatus 1400, including:

a splitting module 1410 configured to determine, on the basis of a text to be recognized, a plurality of character strings corresponding to the text to be recognized, where adjacent character strings in the plurality of character strings partially overlap;

a converting module 1420 configured to perform word vector conversion on the plurality of character strings to obtain a plurality of word vectors, where the plurality of word vectors correspond to the plurality of character strings on a one-to-one basis;

a generating module 1430 configured to generate word vector recognition results respectively corresponding to the plurality of word vectors on the basis of the plurality of word vectors, where the word vector recognition result is an effect text or a non-effect text; and a determining module 1440 configured to determine a text recognition result of the text to be recognized on the basis of the word vector recognition results respectively corresponding to the plurality of word vectors.

Figure 15:
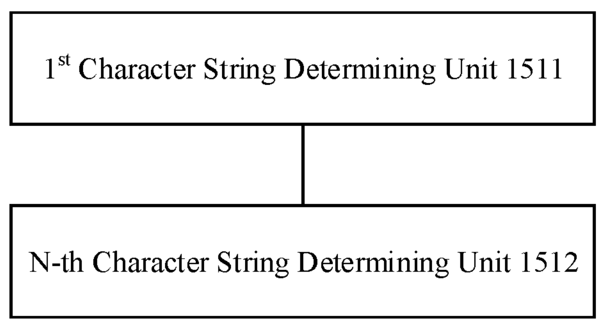
FIG. 15 is a schematic structural diagram of a character string determining unit according to an embodiment of the present disclosure.

FIG. 15 is a schematic structural diagram of a character string determining unit according to an embodiment of the present disclosure. The embodiment shown in FIG. 15 of the present disclosure is derived based on the embodiment shown in FIG. 14 of the present disclosure, the description below will focus on the differences between the embodiments shown in FIG. 15 and FIG. 14, and the similarities between the embodiments will not be repeated.

As shown in FIG. 15, in the text recognition apparatus 1400 according to the embodiment of the present disclosure, the splitting module 1410 includes:

a 1st character string determining unit 1511 configured to determine a 1st character string of a preset string length on the basis of the text to be recognized;

an N-th character string determining unit 1512 configured to take a character in an N-th character string as a starting character of an (N+1)-th character string, decompose the text to be recognized on the basis of the preset character string length and a preset decomposition stride to obtain the (N+1)-th character string, where N is a positive integer greater than or equal to 1 and less than M.

Figure 16:
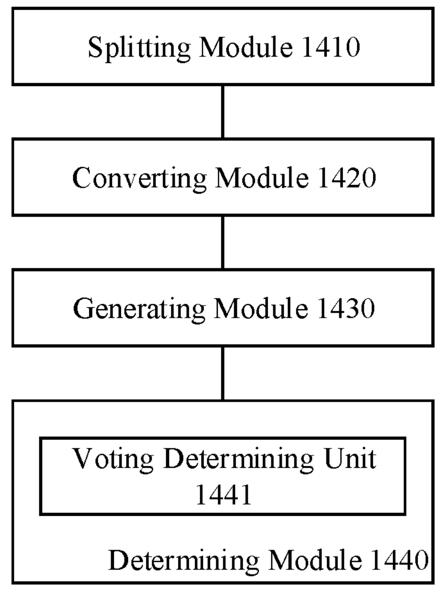
FIG. 16 is a schematic structural diagram of a determining module according to an embodiment of the present disclosure.

FIG. 16 is a schematic structural diagram of the determining module according to an embodiment of the present disclosure. The embodiment shown in FIG. 16 of the present disclosure is derived based on the embodiment shown in FIG. 14 of the present disclosure, the description below will focus on the differences between the embodiments shown in FIG. 16 and FIG. 14, and the similarities between the embodiments will not be repeated.

As shown in FIG. 16, in the text recognition apparatus 1400 according to the embodiment of the present disclosure, the determining module 1440 includes:

a voting determining unit 1441 configured to perform a voting operation on the word vector recognition results respectively corresponding to the plurality of word vectors using a voting mechanism to determine the text recognition result of the text to be recognized.

Figure 17:
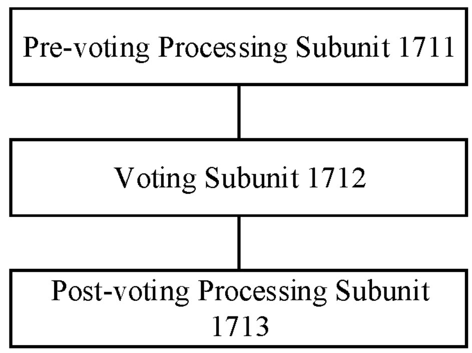
FIG. 17 is a schematic structural diagram of a voting unit according to an embodiment of the present disclosure.

FIG. 17 is a schematic structural diagram of a voting unit according to an embodiment of the present disclosure. The embodiment shown in FIG. 17 of the present disclosure is derived based on the embodiment shown in FIG. 16 of the present disclosure, the description below will focus on the differences between the embodiments shown in FIG. 17 and FIG. 16, and the similarities between the embodiments will not be repeated.

As shown in FIG. 17, in the text recognition apparatus 1400 according to the embodiment of the present disclosure, the voting determining unit 1441 includes:

a pre-voting processing subunit 1711 configured to determine a plurality of units to be recognized corresponding to the text to be recognized on the basis of the text to be recognized, where the unit to be recognized corresponds to at least one of the word vectors;

a voting subunit 1712 configured to, for each unit to be recognized of the plurality of units to be recognized, perform the voting operation on the word vector recognition results corresponding to the unit to be recognized using the voting mechanism to determine the text recognition result of the unit to be recognized; and a post-voting processing subunit 1713 configured to determine the text recognition result corresponding to the text to be recognized on the basis of the text recognition results respectively corresponding to the plurality of units to be recognized.

Figure 18:
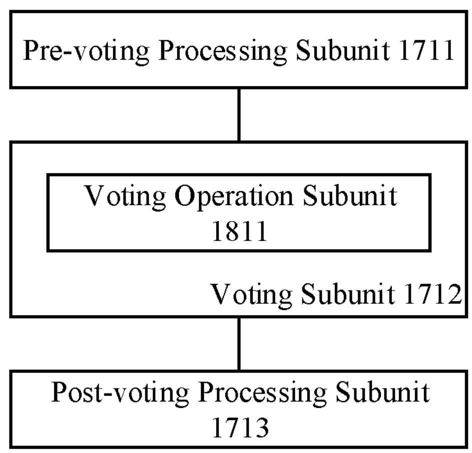
FIG. 18 is a schematic structural diagram of a voting operation subunit according to an embodiment of the present disclosure.

FIG. 18 is a schematic structural diagram of a voting operation subunit according to an embodiment of the present disclosure. The embodiment shown in FIG. 18 of the present disclosure is derived based on the embodiment shown in FIG. 17 of the present disclosure, the description below will focus on the differences between the embodiments shown in FIG. 18 and FIG. 17, and the similarities between the embodiments will not be repeated.

As shown in FIG. 18, in the text recognition apparatus 1400 according to the embodiment of the present disclosure, the voting subunit 1712 includes:

a voting operation subunit 1811 configured to, for each unit to be recognized of the plurality of units to be recognized, if a number of the effect texts is greater than or equal to a number of the non-effect texts in the word vector recognition results corresponding to the unit to be recognized, determine that the text recognition result of the unit to be recognized is the effect text.

Figure 19:
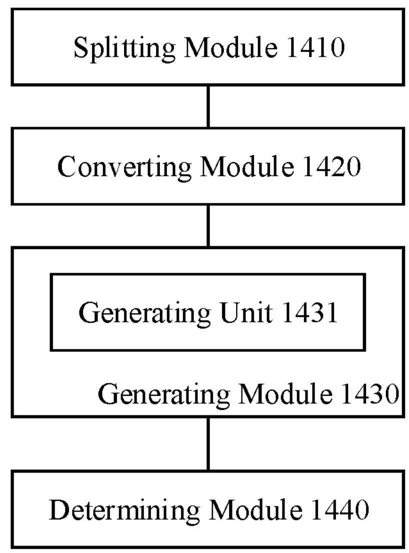
FIG. 19 is a schematic structural diagram of a generating module according to an embodiment of the present disclosure.

FIG. 19 is a schematic structural diagram of a generating module according to an embodiment of the present disclosure. The embodiment shown in FIG. 19 of the present disclosure is derived based on the embodiment shown in FIG. 14 of the present disclosure, the description below will focus on the differences between the embodiments shown in FIG. 19 and FIG. 14, and the similarities between the embodiments will not be repeated.

As shown in FIG. 19, in the text recognition apparatus 1400 according to the embodiment of the present disclosure, the generating module 1430 includes:

a generating unit 1431 configured to generate word vector recognition results respectively corresponding to the plurality of word vectors on the basis of the plurality of word vectors using an effect recognition model, where the effect recognition model is used for generating, on the basis of an input word vector, a word vector recognition result corresponding to the input word vector.

Figure 20:
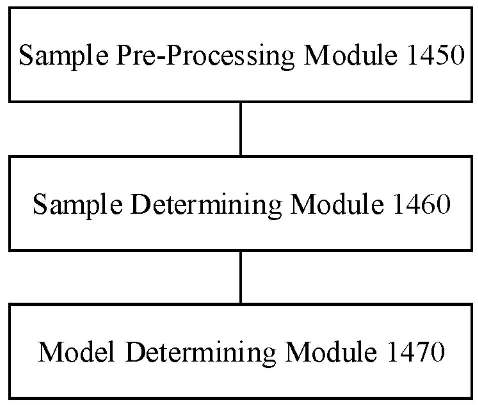
FIG. 20 is a schematic structural diagram of a text recognition apparatus according to another embodiment of the present disclosure.

FIG. 20 is a schematic structural diagram of a text recognition apparatus according to another embodiment of the present disclosure. The embodiment shown in FIG. 20 of the present disclosure is derived based on the embodiment shown in FIG. 19 of the present disclosure, the description below will focus on the differences between the embodiments shown in FIG. 20 and FIG. 19, and the similarities between the embodiments will not be repeated.

As shown in FIG. 20, the text recognition apparatus 1400 according to the embodiment of the present disclosure further includes:

a sample pre-processing module 1450 configured to determine a training text and a text recognition result corresponding to the training text;

a sample determining module 1460 configured to, on the basis of the training text and the text recognition result corresponding to the training text, determine a plurality of word vector samples corresponding to the training text and word vector recognition results respectively corresponding to the plurality of word vector samples; and a model determining module 1470 configured to establish an initial network model, and train the initial network model on the basis of the plurality of word vector samples and the word vector recognition results respectively corresponding to the plurality of word vector samples to generate an effect recognition model.

Figure 21:
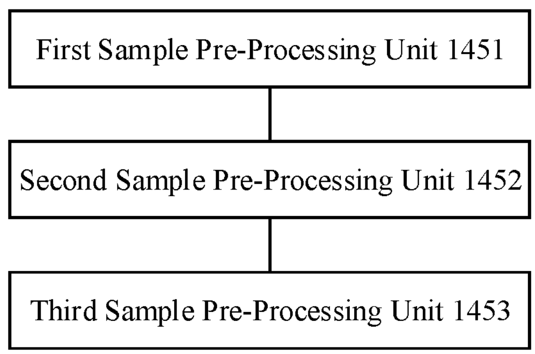
FIG. 21 is a schematic structural diagram of a sample pre-processing module according to an embodiment of the present disclosure.

FIG. 21 is a schematic structural diagram of a sample pre-processing module according to an embodiment of the present disclosure. The embodiment shown in FIG. 21 of the present disclosure is derived based on the embodiment shown in FIG. 20 of the present disclosure, the description below will focus on the differences between the embodiments shown in FIG. 21 and FIG. 20, and the similarities between the embodiments will not be repeated.

As shown in FIG. 21, in the text recognition apparatus 1400 according to an embodiment of the present disclosure, the sample pre-processing module 1450 includes:

a first sample pre-processing unit 1451 configured to acquire a first language training text and a second language training text;

a second sample pre-processing unit 1452 configured to obtain a first effect marking text corresponding to the first language training text on the basis of the first language training text and a first text recognition result; and a third sample pre-processing unit 1453 configured to determine a second text recognition result corresponding to the second language training text on the basis of the first effect marking text.

Figure 22:
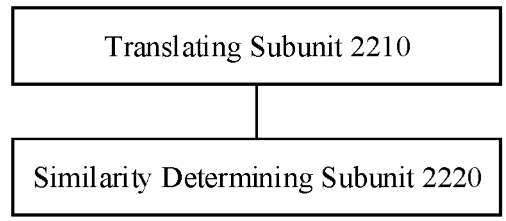
FIG. 22 is a schematic structural diagram of a second sample pre-processing unit according to an embodiment of the present disclosure.

FIG. 22 is a schematic structural diagram of a second sample pre-processing unit according to an embodiment of the present disclosure. The embodiment shown in FIG. 22 of the present disclosure is derived based on the embodiment shown in FIG. 21 of the present disclosure, the description below will focus on the differences between the embodiments shown in FIG. 22 and FIG. 21, and the similarities between the embodiments will not be repeated.

As shown in FIG. 22, in the text recognition apparatus 1400 provided in the embodiment of the present disclosure, the second sample pre-processing unit 1452 includes:

a translating subunit 2210 configured to translate the first effect marking text to obtain a translation text corresponding to the first effect marking text, where the translation text is expressed in the second language;

a similarity determining subunit 2220 configured to determine the second text recognition result on the basis of the translation text corresponding to the first effect marking text using a similarity algorithm.

The translating subunit 2210 is further configured to input the first effect marking text into a text translation model to generate the translation text corresponding to the first effect marking text.

Figure 23:
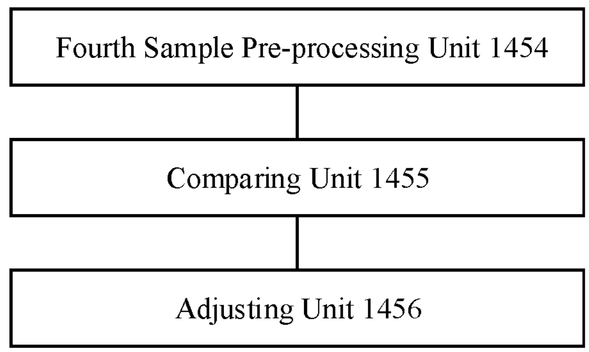
FIG. 23 is a schematic structural diagram of a sample pre-processing module according to another embodiment of the present disclosure.

FIG. 23 is a schematic structural diagram of the sample pre-processing module according to another embodiment of the present disclosure. The embodiment shown in FIG. 23 of the present disclosure is derived based on the embodiment shown in FIG. 21 of the present disclosure, the description below will focus on the differences between the embodiments shown in FIG. 23 and FIG. 21, and the similarities between the embodiments will not be repeated.

As shown in FIG. 23, in the text recognition apparatus 1400 according to the embodiment of the present disclosure, the sample pre-processing module 1450 further includes:

a fourth sample pre-processing unit 1454 configured to determine a second effect marking text corresponding to the second language training text;

a comparing unit 1455 configured to determine an accuracy of the second text recognition result on the basis of the second text recognition result and the second effect marking text; and an adjusting unit 1456 configured to adjust the training text according to the accuracy of the second text recognition result.

Figure 24:
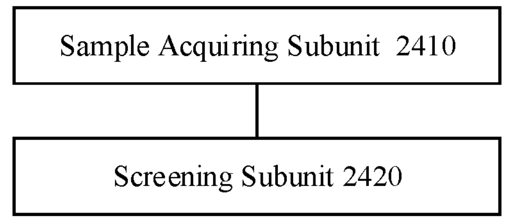
FIG. 24 is a schematic structural diagram of a first sample pre-processing unit according to another embodiment of the present disclosure.

FIG. 24 is a schematic structural diagram of the first sample pre-processing unit according to another embodiment of the present disclosure. The embodiment shown in FIG. 24 of the present disclosure is derived based on the embodiment shown in FIG. 21 of the present disclosure, the description below will focus on the differences between the embodiments shown in FIG. 24 and FIG. 21, and the similarities between the embodiments will not be repeated.

As shown in FIG. 24, in the text recognition apparatus 1400 according to the embodiment of the present disclosure, the first sample pre-processing unit 1451 further includes:

a sample acquiring subunit 2410 configured to acquire text data including patent family text data in a plurality of different languages; and a screening subunit 2420 configured to screen the first language training text and the second language training text on the basis of the patent family text data.

Exemplary Electronic Device

Figure 25:
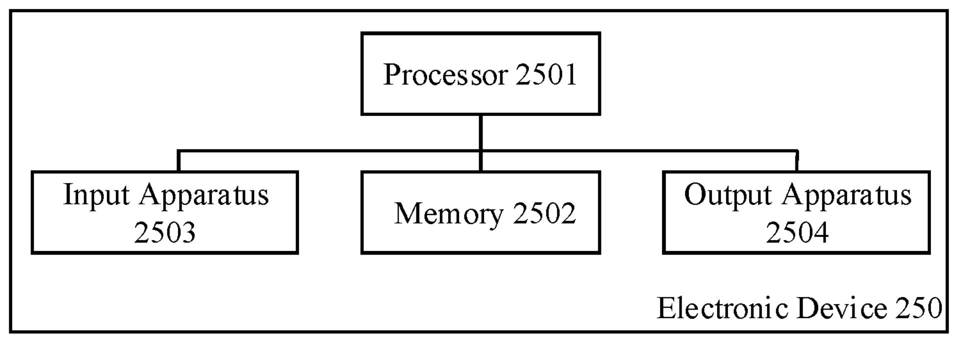
FIG. 25 is a schematic structural diagram of an electronic device according to an embodiment of the present disclosure.

FIG. 25 is a schematic structural diagram of an electronic device according to an embodiment of the present disclosure. As shown in FIG. 25, the electronic device 250 includes one or more processors 2501, a memory 2502, and computer program instructions stored in the memory 2502 that, when executed by the processor 2501, cause the processor 2501 to perform the text recognition method described in any of the embodiments above.

The processor 2501 may be a central processing unit (CPU) or a processing unit that is in other forms and has a data processing capability and/or an instruction execution capability, and may control other components in the electronic device to perform desired functions.

The memory 2502 may include one or more computer program products, which may include various forms of computer-readable storage medium, such as volatile memory and/or non-volatile memory. The volatile memory can include, for example, a random-access memory (RAM) and/or a cache memory (cache). The non-volatile memory may include, for example, a read-only memory (ROM), a hard disk, and a flash memory. One or more computer program instructions may be stored on a computer-readable storage medium, and the processor 2501 may execute the program instructions to perform the steps in the text recognition methods described in the various embodiments of the present disclosure above and/or other desired functions.

In an example, the electronic device 250 may further include an input apparatus 2503 and an output apparatus 2504, which are interconnected by a bus system and/or a connection mechanism that is in other forms (not shown in FIG. 25).

In addition, the input apparatus 2503 may include, for example, a keyboard, a mouse, and a microphone, etc.

The output apparatus 2504 may output various information to the outside and may include, for example, a display, a speaker, a printer, and a communication network and remote output device connected thereto, etc.

For simplicity, only some of the components of the electronic device 250 relevant to the present disclosure are shown in FIG. 25, and components such as a bus, an input apparatus/an output interface, and so on are omitted. In addition, the electronic device 250 may include any other suitable components depending on the particular application.

Exemplary Computer-Readable Storage Medium

In addition to the methods and devices described above, the embodiment of the present disclosure may also be a computer program product including computer program instructions that, when executed by a processor, cause the processor to perform steps in the text recognition method described in any of the embodiments above.

In the computer program product, program codes for performing operations of embodiments of the present disclosure may be compiled in any combination of one or more programming languages. The programming languages include object-oriented programming languages, such as Java, C++, and so on, and conventional procedural programming languages, such as C, or similar programming languages. The program codes may be executed entirely on a user computing device, executed partially on a user device, executed as an independent software package, executed partially on a user computing device and partially on a remote computing device, or executed entirely on the remote computing device or a server.

Furthermore, the embodiment of the present disclosure may also be a computer-readable storage medium having stored thereon computer program instructions that, when executed by a processor, cause the processor to perform steps in the text recognition method according to various embodiments of the present disclosure as described in the part of "Exemplary Method" herein.

The computer-readable storage medium may be implemented in a form of any combination of one or more readable media. The readable medium may be a readable signal medium or a readable storage medium. The readable storage medium can include, for example but not limited to, an electronic, magnetic, optical, electromagnetic, infrared, or semiconductor system, apparatus, or means, or any combination thereof. More specific examples (a non-exhaustive list) of the readable storage media include: an electrical connection with one or more wires, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

While the basic principles of the present disclosure have been described above in connection with specific embodiments, it is to be noted that the benefits, advantages, and effects mentioned in the present disclosure are merely exemplary and not limiting, and are not to be construed as necessarily possessed by each embodiment of the present disclosure. Furthermore, the specific details disclosed above are only for the purposes of illustration and understanding and are not limiting, and the implementation of the present disclosure is not limited to the specific details disclosed above.

The block diagrams of means, apparatuses, devices, and systems involved in the present disclosure are merely illustrative examples and are not intended to require or imply that the connections, arrangements, and configurations must be provided in the manner shown in the block diagrams. The means, apparatuses, devices, and systems may be connected, arranged, and configured in any manner, as will be appreciated by those skilled in the art. Words such as "including/comprising", "containing", and "having" indicate an open inclusion that means "including/comprising, but not limited to", and they can be used interchangeably. Words like "or" and "and" as used herein refer to "and/or" and may be used interchangeably therewith unless the context clearly indicates otherwise. As used herein, the phrase "for example" refers to "for example but not limited to" and they can be used interchangeably.

It should also be noted that in the apparatus, device, and method of the present disclosure, the components or steps may be split and/or recombined. Such splitting and/or recombining should be considered as an equivalent solution of the present disclosure.

The previous description of the disclosed aspects is provided to enable any person skilled in the art to make or use the present disclosure. Various modifications to these aspects will be obviously apparent to those skilled in the art, and the generic principles defined herein may be applied to other aspects without departing from the scope of the present disclosure. Thus, the present disclosure is not intended to be limited to the aspects shown herein but is to be accorded the broadest scope consistent with the principles and novel features disclosed herein.

The foregoing description has been presented for purposes of illustration and description. Furthermore, this description is not intended to limit the embodiments of the present disclosure to the forms disclosed herein. Although a number of exemplary aspects and embodiments have been discussed above, those skilled in the art will recognize certain variations, modifications, changes, additions, and sub-combinations thereof.

The foregoing is directed to the preferred embodiments of the present disclosure and is not intended to limit the present disclosure. Any modification, equivalent substitution and the like made without departing from the spirit and principles of the present disclosure shall fall within the protection scope of the present disclosure.

The invention claimed is:

1. A text recognition method, comprising:

determining, on the basis of a text to be recognized, a plurality of character strings corresponding to the text to be recognized, wherein adjacent character strings in the plurality of character strings partially overlap;

performing word vector conversion on the plurality of character strings to obtain a plurality of word vectors, wherein the plurality of word vectors correspond to the plurality of character strings on a one-to-one basis;

generating word vector recognition results respectively corresponding to the plurality of word vectors on the basis of the plurality of word vectors, wherein the word vector recognition result is an effect text or a non-effect text, and the effect text is a text representing technical effects in a patent text;

determining a text recognition result of the text to be recognized on the basis of the word vector recognition results respectively corresponding to the plurality of word vectors, the determining improving the accuracy of text recognition; and classifying the patent text according to the text recognition result, wherein the generating word vector recognition results respectively corresponding to the plurality of word vectors on the basis of the plurality of word vectors comprises:

determining a training text and a text recognition result corresponding to the training text, wherein the training text is a patent text, and comprises a first language training text and a second language training text, the first language training text comprises text contents written in the first language, the second language training text comprises text contents written in the second language, the text recognition result corresponding to the first language training text is a first text recognition result, and the text recognition result corresponding to the second language training text is a second text recognition result;

on the basis of the training text and the text recognition result corresponding to the training text, determining a plurality of word vector samples corresponding to the training text and word vector recognition results respectively corresponding to the plurality of word vector samples;

establishing an initial network model, and training the initial network model on the basis of the plurality of word vector samples and the word vector recognition results respectively corresponding to the plurality of word vector samples to generate an effect recognition model used for generating, on the basis of an input word vector, a word vector recognition result corresponding to the input word vector; and generating the word vector recognition results respectively corresponding to the plurality of word vectors on the basis of the plurality of word vectors using the effect recognition model, the generating the word vector recognition results using the effect recognition model improving an efficiency of text recognition, wherein the determining a training text and a text recognition result corresponding to the training text comprises:

acquiring the first language training text and the second language training text;

obtaining a first effect marking text corresponding to the first language training text on the basis of the first language training text and the first text recognition result; and determining the second text recognition result corresponding to the second language training text on the basis of the first effect marking text, wherein the acquiring the first language training text and the second language training text comprises:

acquiring text data comprising patent family text data in a plurality of different languages; and screening the first language training text and the second language training text on the basis of the patent family text data, wherein the first language training text comprises effect identification paragraph information, and the second language training text comprises patent text to be marked with effect.

2. The text recognition method according to claim 1, wherein the number of the plurality of character strings is M, wherein M is a positive integer greater than 1, and the determining, on the basis of a text to be recognized, a plurality of character strings corresponding to the text to be recognized comprises:

determining a 1st character string of a preset string length on the basis of the text to be recognized; and taking a character in an N-th character string as a starting character of an (N+1)-th character string, decomposing the text to be recognized on the basis of the preset string length and a preset decomposition stride to obtain the (N+1)-th character string, wherein N is a positive integer greater than or equal to 1 and less than M.

3. The text recognition method according to claim 1, wherein the determining a text recognition result of the text to be recognized on the basis of the word vector recognition results respectively corresponding to the plurality of word vectors comprises:

performing a voting operation on word vector recognition results respectively corresponding to the plurality of word vectors using a voting mechanism to determine the text recognition result of the text to be recognized.

4. The text recognition method according to claim 3, wherein the performing a voting operation on word vector recognition results respectively corresponding to the plurality of word vectors using a voting mechanism to determine the text recognition result of the text to be recognized comprises:

determining a plurality of units to be recognized corresponding to the text to be recognized on the basis of the text to be recognized, wherein the unit to be recognized corresponds to at least one of the word vectors;

for each unit to be recognized in the plurality of units to be recognized, performing the voting operation on word vector recognition results corresponding to the unit to be recognized using the voting mechanism to determine the text recognition result of the unit to be recognized; and determining the text recognition result corresponding to the text to be recognized on the basis of text recognition results respectively corresponding to the plurality of units to be recognized.

5. The text recognition method according to claim 4, wherein the unit to be recognized comprises at least one of a sentence, a paragraph, and a text module in the patent text, wherein the text module comprises at least one of an abstract module, a claims module, and a description module.

6. The text recognition method according to claim 4, wherein the performing the voting operation on word vector recognition results corresponding to the unit to be recognized using the voting mechanism to determine the text recognition result of the unit to be recognized comprises:

if the number of the effect texts is greater than or equal to the number of the non-effect texts in the word vector recognition results corresponding to the unit to be recognized, determining that the text recognition result of the unit to be recognized is the effect text.

7. The text recognition method according to claim 4, wherein performing the voting operation on word vector recognition results corresponding to the unit to be recognized using the voting mechanism to determine the text recognition result of the unit to be recognized comprises:

if the number of the effect texts is less than the number of the non-effect texts in the word vector recognition results corresponding to the text to be recognized, determining that the text recognition result of the unit to be recognized is the non-effect text.

8. The text recognition method according to claim 1, wherein the initial network model comprises a BERT model.

9. The text recognition method according to claim 1, wherein determining the second text recognition result corresponding to the second language training text on the basis of the first effect marking text comprises:

translating the first effect marking text to obtain a translation text corresponding to the first effect marking text, wherein the translation text is expressed in the second language; and determining the second text recognition result on the basis of the translation text corresponding to the first effect marking text using a similarity algorithm.

10. The text recognition method according to claim 9, wherein the translating the first effect marking text to obtain a translation text corresponding to the first effect marking text comprises:

inputting the first effect marking text into a text translation model to generate the translation text corresponding to the first effect marking text.

11. The text recognition method according to claim 1, wherein the first language comprises Japanese, and the first language training text comprises a Japanese patent text.

12. The text recognition method according to claim 1, wherein the first language training text and the second language training text belong to a same patent family.

13. The text recognition method according to claim 1, wherein the first language training text comprises a Japanese patent text, and the second language training text is Chinese patent text.

14. A non-transitory computer-readable storage medium, wherein the storage medium is stored with instructions that, when executed by a processor of an electronic device, enable the electronic device to perform a text recognition method, wherein the text recognition method comprises:

determining, on the basis of a text to be recognized, a plurality of character strings corresponding to the text to be recognized, wherein adjacent character strings in the plurality of character strings partially overlap;

performing word vector conversion on the plurality of character strings to obtain a plurality of word vectors, wherein the plurality of word vectors correspond to the plurality of character strings on a one-to-one basis;

generating word vector recognition results respectively corresponding to the plurality of word vectors on the basis of the plurality of word vectors, wherein the word vector recognition result is an effect text or a non-effect text, and the effect text is a text representing technical effects in a patent text;

determining a text recognition result of the text to be recognized on the basis of the word vector recognition results respectively corresponding to the plurality of word vectors, the determining improving the accuracy of text recognition; and classifying the patent text according to the text recognition result, wherein the generating word vector recognition results respectively corresponding to the plurality of word vectors on the basis of the plurality of word vectors comprises:

determining a training text and a text recognition result corresponding to the training text, wherein the training text is a patent text, and comprises a first language training text and a second language training text, the first language training text comprises text contents written in the first language, the second language training text comprises text contents written in the second language, the text recognition result corresponding to the first language training text is a first text recognition result, and the text recognition result corresponding to the second language training text is a second text recognition result;

on the basis of the training text and the text recognition result corresponding to the training text, determining a plurality of word vector samples corresponding to the training text and word vector recognition results respectively corresponding to the plurality of word vector samples;

establishing an initial network model, and training the initial network model on the basis of the plurality of word vector samples and the word vector recognition results respectively corresponding to the plurality of word vector samples to generate an effect recognition model used for generating, on the basis of an input word vector, a word vector recognition result corresponding to the input word vector; and generating the word vector recognition results respectively corresponding to the plurality of word vectors on the basis of the plurality of word vectors using the effect recognition model, the generating the word vector recognition results using the effect recognition model improving an efficiency of text recognition, wherein the determining a training text and a text recognition result corresponding to the training text comprises:

acquiring the first language training text and the second language training text;

obtaining a first effect marking text corresponding to the first language training text on the basis of the first language training text and the first text recognition result; and determining the second text recognition result corresponding to the second language training text on the basis of the first effect marking text, wherein the acquiring the first language training text and the second language training text comprises:

acquiring text data comprising patent family text data in a plurality of different languages; and screening the first language training text and the second language training text on the basis of the patent family text data, wherein the first language training text comprises effect identification paragraph information, and the second language training text comprises patent text to be marked with effect.

15. An electronic device, comprising:

a processor; and a memory for storing computer-executable instructions;

wherein the processor is configured to execute the computer-executable instructions to implement a text recognition method, wherein the text recognition method comprises:

determining, on the basis of a text to be recognized, a plurality of character strings corresponding to the text to be recognized, wherein adjacent character strings in the plurality of character strings partially overlap;

performing word vector conversion on the plurality of character strings to obtain a plurality of word vectors, wherein the plurality of word vectors correspond to the plurality of character strings on a one-to-one basis;

generating word vector recognition results respectively corresponding to the plurality of word vectors on the basis of the plurality of word vectors, wherein the word vector recognition result is an effect text or a non-effect text, and the effect text is a text representing technical effects in a patent text;

determining a text recognition result of the text to be recognized on the basis of the word vector recognition results respectively corresponding to the plurality of word vectors, the determining improving the accuracy of text recognition; and classifying the patent text according to the text recognition result, wherein the generating word vector recognition results respectively corresponding to the plurality of word vectors on the basis of the plurality of word vectors comprises:

determining a training text and a text recognition result corresponding to the training text, wherein the training text is a patent text, and comprises a first language training text and a second language training text, the first language training text comprises text contents written in the first language, the second language training text comprises text contents written in the second language, the text recognition result corresponding to the first language training text is a first text recognition result, and the text recognition result corresponding to the second language training text is a second text recognition result;

on the basis of the training text and the text recognition result corresponding to the training text, determining a plurality of word vector samples corresponding to the training text and word vector recognition results respectively corresponding to the plurality of word vector samples;

establishing an initial network model, and training the initial network model on the basis of the plurality of word vector samples and the word vector recognition results respectively corresponding to the plurality of word vector samples to generate an effect recognition model used for generating, on the basis of an input word vector, a word vector recognition result corresponding to the input word vector; and generating the word vector recognition results respectively corresponding to the plurality of word vectors on the basis of the plurality of word vectors using the effect recognition model, the generating the word vector recognition results using the effect recognition model improving an efficiency of text recognition, wherein the determining a training text and a text recognition result corresponding to the training text comprises:

acquiring the first language training text and the second language training text;

obtaining a first effect marking text corresponding to the first language training text on the basis of the first language training text and the first text recognition result; and determining the second text recognition result corresponding to the second language training text on the basis of the first effect marking text, wherein the acquiring the first language training text and the second language training text comprises:

acquiring text data comprising patent family text data in a plurality of different languages; and screening the first language training text and the second language training text on the basis of the patent family text data, wherein the first language training text comprises effect identification paragraph information, and the second language training text comprises patent text to be marked with effect.

* * * * *